(12) United States Patent
Weisenburg, III

(10) Patent No.: US 6,874,273 B1
(45) Date of Patent: Apr. 5, 2005

(54) PORTABLE WINDOW UNIT FOR KILLING INSECTS

(76) Inventor: Edward F. Weisenburg, III, 21 North Dr., Haddonfield, NJ (US) 08033

( * ) Notice: Subject to any disclaimer, the term of this patent is extended or adjusted under 35 U.S.C. 154(b) by 0 days.

(21) Appl. No.: 10/840,472

(22) Filed: May 6, 2004

(51) Int. Cl.$^7$ .............................. A01M 1/22; A01M 1/24
(52) U.S. Cl. ........................................... 43/112; 43/119
(58) Field of Search .................................. 43/112, 119

(56) References Cited

U.S. PATENT DOCUMENTS

| | | | | |
|---|---|---|---|---|
| 882,631 A | * | 3/1908 | Fuller ............................. | 43/119 |
| 1,059,253 A | * | 4/1913 | Wimbish ......................... | 43/112 |
| 1,167,855 A | * | 1/1916 | Stipp .............................. | 43/112 |
| 1,334,099 A | * | 3/1920 | Johnson .......................... | 43/119 |
| 1,340,779 A | * | 5/1920 | Lee ................................. | 43/119 |
| 1,411,189 A | * | 3/1922 | Samuelson ...................... | 43/119 |
| 1,429,691 A | * | 9/1922 | Pandolfo ......................... | 43/112 |
| 1,651,999 A | * | 12/1927 | Coglon ............................ | 43/112 |
| 1,730,814 A | * | 10/1929 | Frost ............................... | 43/112 |
| 1,754,748 A | * | 4/1930 | Frost ............................... | 43/112 |
| 1,848,625 A | * | 3/1932 | Hager ............................. | 43/112 |
| 1,871,978 A | * | 8/1932 | Frost ............................... | 43/112 |
| 1,879,495 A | * | 9/1932 | Renwick ......................... | 43/112 |
| 1,882,550 A | * | 10/1932 | Frost ............................... | 43/112 |
| 1,895,570 A | * | 1/1933 | Frost ............................... | 43/112 |
| 1,910,623 A | * | 5/1933 | McWilliams et al. ........... | 43/112 |
| 1,981,951 A | * | 11/1934 | Folmer ............................ | 43/112 |
| 2,001,414 A | * | 5/1935 | Folmer et al. ................... | 43/112 |
| 2,030,310 A | * | 2/1936 | McWilliams et al. ........... | 43/112 |
| 2,052,945 A | * | 9/1936 | Scott ............................... | 43/112 |
| 2,080,242 A | * | 5/1937 | Ward .............................. | 43/112 |
| 2,095,323 A | * | 10/1937 | Di Marino ...................... | 43/112 |
| 2,117,767 A | * | 5/1938 | Lindsley ......................... | 43/112 |
| 2,123,127 A | * | 7/1938 | Whipple ......................... | 43/112 |
| 2,159,618 A | * | 5/1939 | Lindsley ......................... | 43/112 |
| 2,165,560 A | * | 7/1939 | Luther ............................ | 43/112 |
| 2,177,846 A | * | 10/1939 | Swangren ....................... | 43/112 |
| 2,218,369 A | * | 10/1940 | Whipple ......................... | 43/112 |
| 2,278,538 A | * | 4/1942 | Dubilier ......................... | 43/112 |
| 3,077,050 A | * | 2/1963 | Makara .......................... | 43/112 |
| 4,182,069 A | * | 1/1980 | De Yoreo ....................... | 43/112 |
| 4,300,306 A | * | 11/1981 | Hudgin ........................... | 43/112 |
| 4,908,978 A | * | 3/1990 | Zacharias ....................... | 43/112 |
| 5,347,748 A | * | 9/1994 | Moreland et al. .............. | 43/112 |
| 5,519,963 A | * | 5/1996 | Shih ............................... | 43/112 |
| 6,305,122 B1 | * | 10/2001 | Iwao et al. ..................... | 43/112 |
| 6,341,444 B1 | * | 1/2002 | Cina et al. ...................... | 43/119 |
| 6,474,014 B1 | * | 11/2002 | Yu ................................. | 43/112 |
| 6,568,124 B1 | * | 5/2003 | Wilbanks ....................... | 43/112 |
| 6,591,545 B2 | * | 7/2003 | Brunet ........................... | 43/112 |

FOREIGN PATENT DOCUMENTS

| | | | | |
|---|---|---|---|---|
| DE | 681298 A1 | * | 8/1939 | |
| DE | 10153248 A1 | * | 5/2003 | |
| GB | 1925 A1 | * | of 1911 | .................. 43/112 |
| GB | 2264621 A1 | * | 9/1993 | |
| IT | 329138 A1 | * | 9/1935 | .................. 43/112 |
| JP | 11-346629 B1 | * | 12/1999 | |
| JP | 2001-252000 B1 | * | 9/2001 | |
| JP | 2002-159251 B1 | * | 6/2002 | |
| JP | 2003-23908 B1 | * | 1/2003 | |

* cited by examiner

Primary Examiner—Darren W. Ark
(74) Attorney, Agent, or Firm—Stuart M. Goldstein

(57) ABSTRACT

A portable, self-contained unit has two spaced apart electrical wire grid screens. One of the screens has a positive charge and the other has a negative charge. Electrical power is provided to a transformer which provides the necessary electrical current to the grid screens. Flying insects attempting to pass between the dual electrified grid screens are electrocuted. A third screen is located behind the dual electrical screens, at the rear of the unit, adjacent to the living space. The dual screens are secured within a frame which is made of a non-electrical conducting material. The entire unit is configured to be positioned within a window opening and secured within the opening by slideably adjustable wing elements which moveably extend laterally from the frame.

4 Claims, 4 Drawing Sheets

PORTABLE WINDOW UNIT FOR KILLING INSECTS

BACKGROUND OF THE INVENTION

There are a number of devices for deterring or killing harmful, flying insects such as mosquitoes, biting flies, wasps, and the like, which use electrical screens or grids mounted in housings. These devices, primarily employed for outdoor protection, are usually strategically placed outside of and in the vicinity of buildings or dwellings. The insects are attracted to the grids by various means, including light, heat, chemicals and, upon entry of the grid, are either stunned or killed. However, these devices, such as shown in U.S. Pat. No. 4,182,069 and U.S. Pat. No. 6,568,124, are typically apparatus which are configured to be hung outside, in selected areas. In the past, electrified insect screens have also been used as permanent mounts in windows or doors to eliminate flying mosquitoes and parasitic insects. Examples of such permanent screening systems are seen in U.S. Pat. No. 1,059,253 and U.S. Pat. No. 2,117,767.

While insect killing systems like those disclosed in the referenced patents and others use some form of electrical screen or gird as the deterring mechanism, they are not designed to be portably and removeably positioned to prevent entry of insects directly into living spaces. More specifically, there currently is no self-contained, portable device which is effective in attracting and killing mosquitoes and other flying insects, which is easily and readily adapted for use in windows of buildings, houses, and other living spaces.

SUMMARY OF THE INVENTION

Thus, it is an object of the present invention to overcome the limitations and disadvantages of previous insect killing devices.

It is an object of the present invention to provide a portable, self-contained unit for killing all types of flying insects and which is thus effective in preventing insects from entering living spaces.

It is a further object of the present invention to provide a portable, self-contained unit for killing flying insects which is easily and readily insertable into and removed from a window opening.

It is still another object of the present invention to provide a portable, self-contained unit for killing flying insects which is effective in attracting insects for termination.

It is a further object of the present invention to provide a portable, self-contained unit for killing flying insects which is effective in killing and eliminating all flying insects before they enter a living space.

It is still another object of the present invention to provide a portable, self-contained unit for killing flying insects which provides a lethal electrical shock to all insects prior to their entering living spaces.

These and other objects are accomplished by the present invention, a portable self-contained window unit which has two spaced apart electrical wire grid screens. One of the grid screens has a positive charge and the other has a negative charge. Electrical power is provided to a transformer which supplies the necessary electrical current to the grid screens. Flying insects attempting to pass between the dual electrified grid screens are electrocuted. A third screen is located behind the dual electrical screens, at the rear of the unit, adjacent to the living space. The dual screens are secured within a frame which is made of a non-electrical conducting material. The entire unit is configured to be positioned within a window opening and secured within the opening by slideably adjustable wing elements which moveably extend laterally from the frame.

The novel features which are considered as characteristic of the invention are set forth in particular in the appended claims. The invention itself, however, both as to its design, construction, and use, together with the additional features and advantages thereof, are best understood upon review of the following detailed description with reference to the brief description of the drawings.

DETAILED DESCRIPTION OF THE INVENTION

Figure 1:
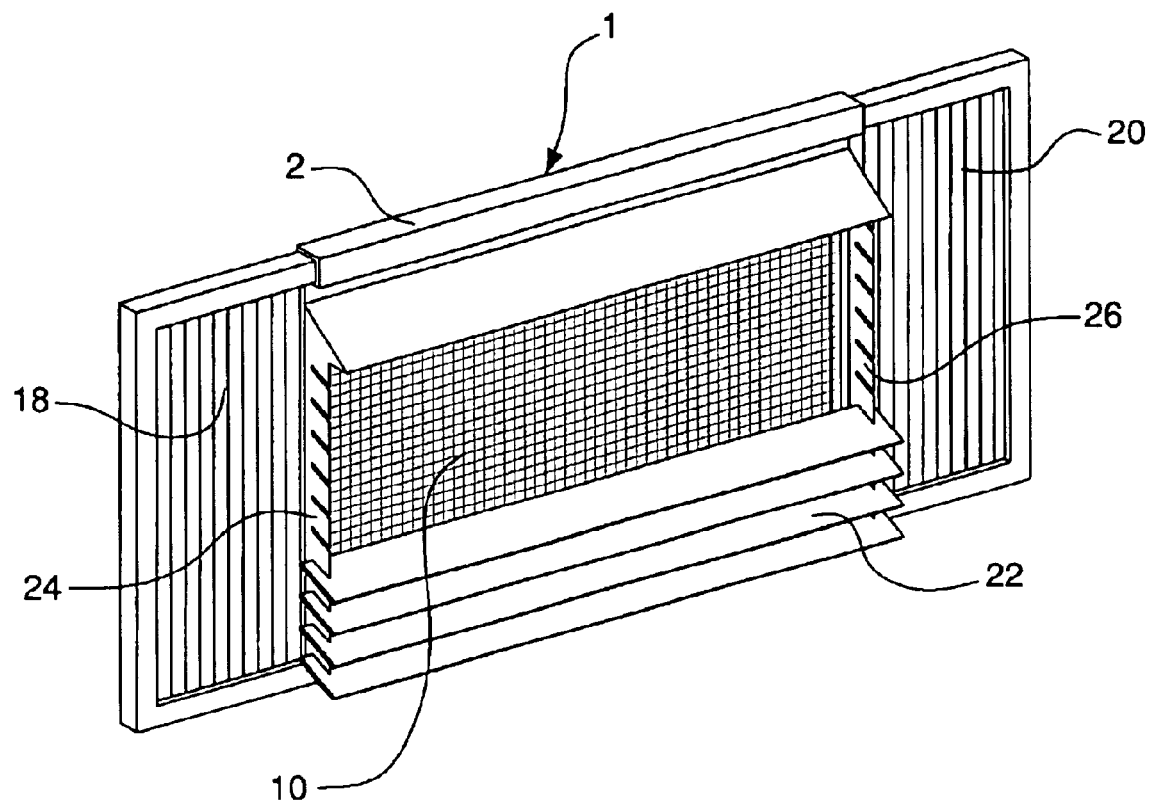
FIG. 1 is a perspective front view of the portable window unit of the present invention.
Figure 2:
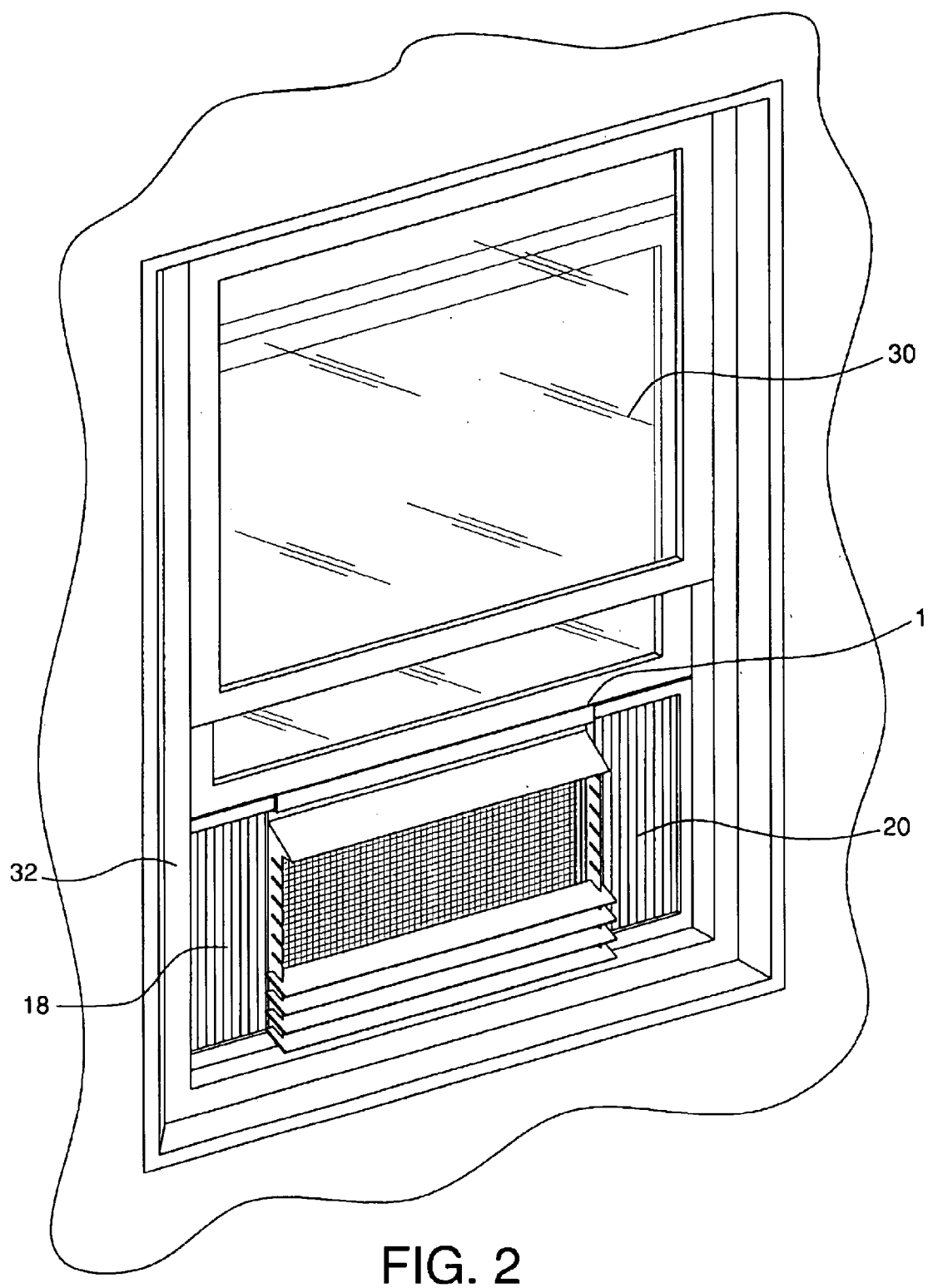
FIG. 2 is a perspective front view of the portable window unit installed in a window opening.
Figure 3:
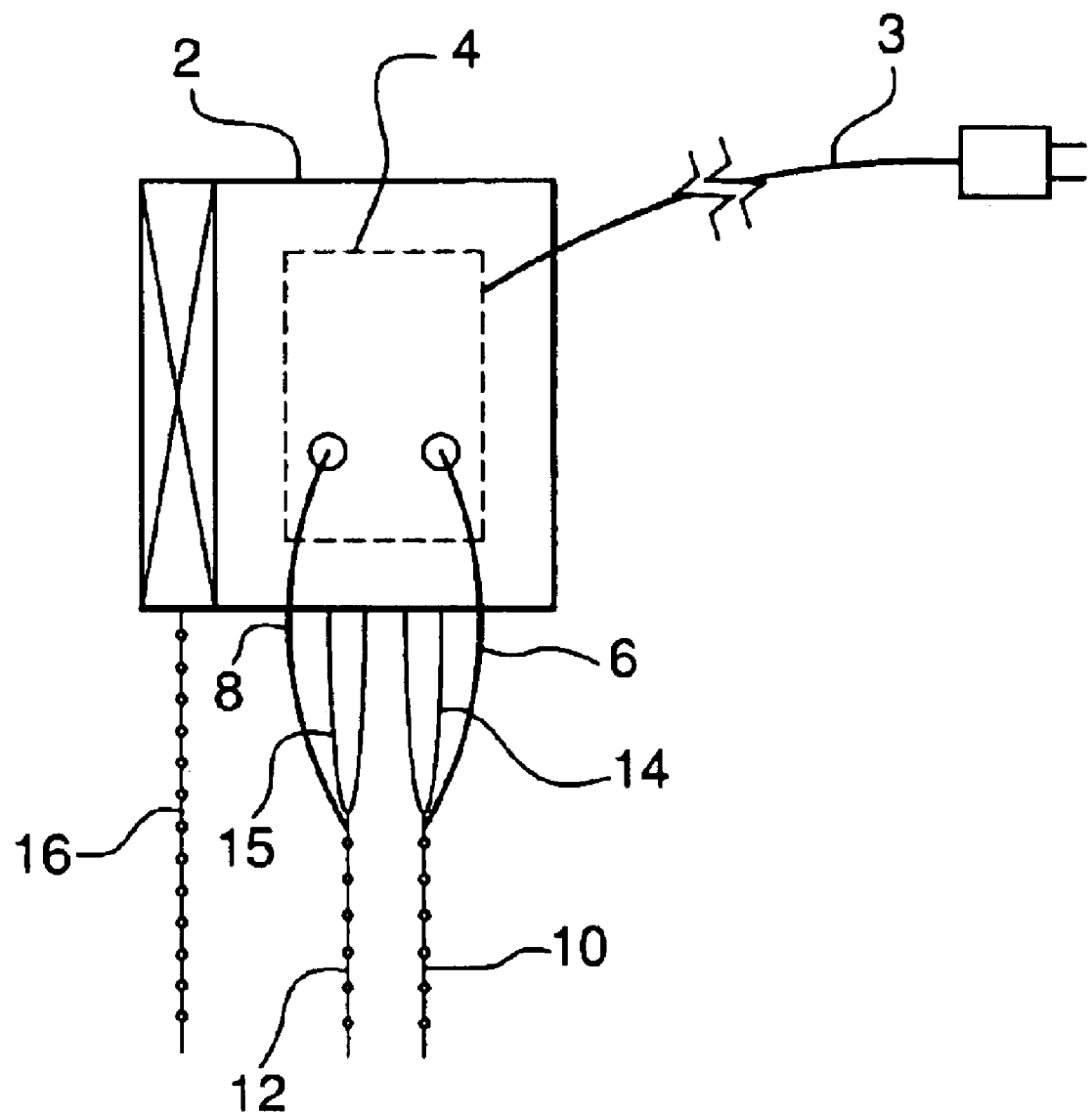
FIG. 3 is a partial side-sectional view of the portable window unit of the present invention.
Figure 4:
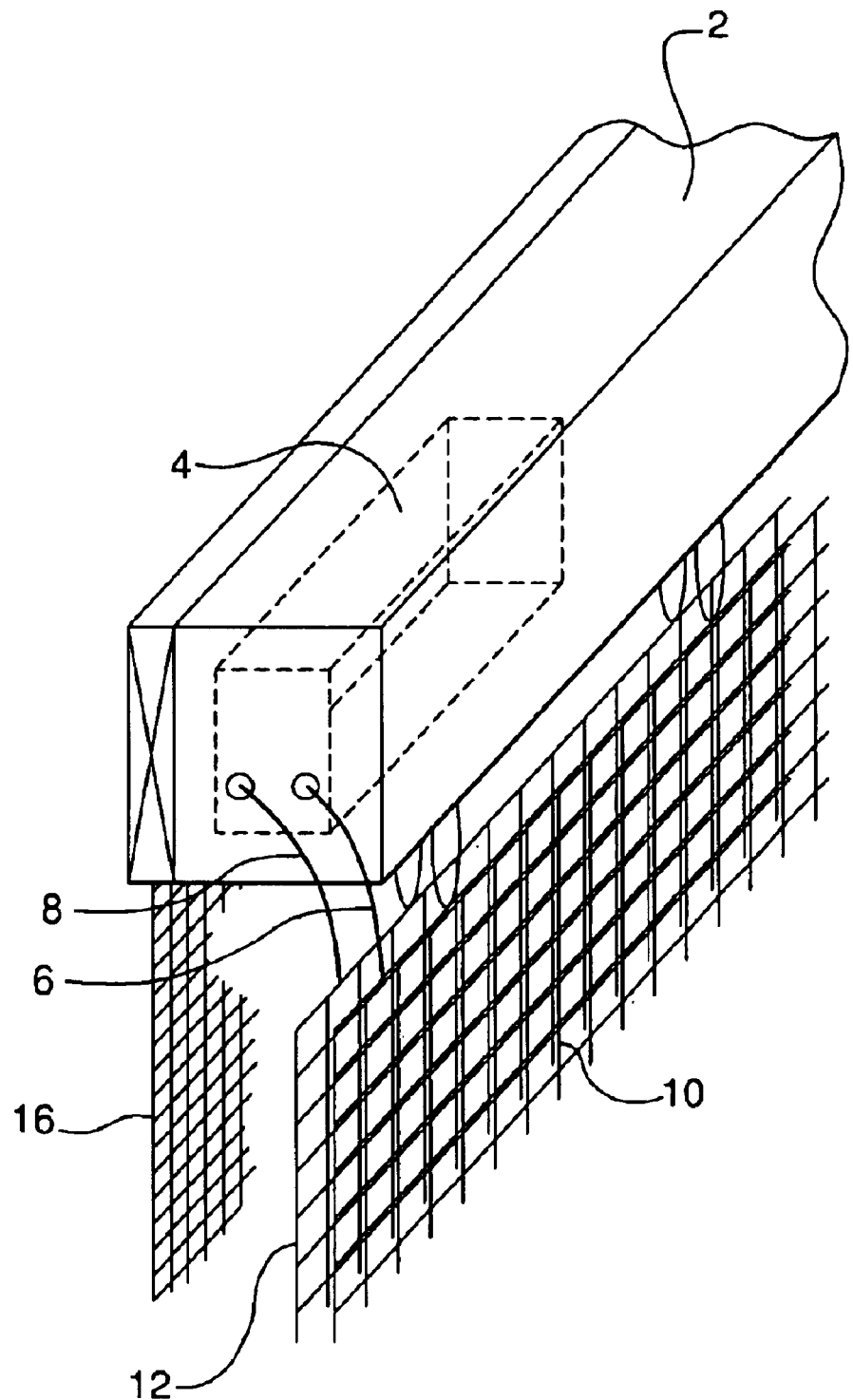
FIG. 4 is a partial perspective-sectional view of the portable window unit of the present invention.

Portable window unit 1 comprises outer frame 2 which is made of non-electrical conducting material. Plug and electrical cord 3 provide electrical current to transformer 4 mounted within outer frame 2. Electrical current is transmitted from transformer 4 via electrical leads 6 and 8 to grid screens 10 and 12 respectively. One of grid screens 10 and 12 has a positive charge and the other has a negative charge. Grid screens 10 and 12 extend from and are secured to outer frame 2 by non-electrical conducting connectors 14 and 15 extending between the outer frame and the grid screens. Grid screens 10 and 12 are located substantially parallel to and in close proximity to each other, approximately a inch apart. By positioning grid screens 10 and 12 in this manner, a flying insect which enters grid screen 10 will complete the electrical circuit and be electrocuted as it contacts grid screen 12.

A third fine mesh screen 16 is mounted within and extends from outer frame 2. This screen prevents the entry into living spaces of smaller insects which may some how get through grid screens 10 and 12.

Extendable wing members 18 and 20 are slideably mounted within outer frame 2, in order to allow secure placement of unit 1 in a variety of sized windows. To accomplish this, unit 1 is placed in window 30. Wing members 18 and 20 are slideably extended outward to rigidly secure the unit within inner vertical frame 32 of the window. Horizontal window framing 34 is then pulled down to rest upon unit 1. It is contemplated that appropriate resilient sealing material would be placed between outer frame 2 and frame 34 to form a tight seal between unit 1 and window 30.

When unit 1 is to be removed, wing members 18 and 20 are slid inward, away from frame 32. Unit 1 can then easily be removed from window 30 and, if desired, replaced in another window or stored.

Adjustable, pivotable louvers 22 extend outwardly from side frames 24 and 26. Louvers can be adjusted to control the admission of light and weather into the living space.

In use, once unit 1 is rigidly mounted within window 30 by means of wing members 18 and 20, louvers 22 are placed in an open position. This allows the light and heat being emitted from within the living space, as well as the carbon dioxide being exhaled by the inhabitants of the space, to pass through window 30 and grid screens 10 and 12. The light, heat, and carbon monoxide attracts flying insects, which are then drawn towards the window. The insects, flying towards this light/heat/gaseous source, contact grid screens 10 and 12 and are electrocuted.

Certain novel features and components of this invention are disclosed in detail in order to make the invention clear in at least one form thereof. However, it is to be clearly understood that the invention is not necessarily limited to the exact form and details as disclosed, since it is apparent that various modifications and changes may be made without departing from the spirit of the invention.

I claim:

1. A unitary, self-contained, portable insect termination unit comprising:

(a) an outer frame made of non-electrical conducting material, said frame being substantially configured to conform to an opening of a window;

(b) an electrical transformer mounted within the frame;

(c) means to supply electrical current to the transformer;

(d) an outer screen mounted to and extending from the frame;

(e) an inner screen mounted to and extending from the frame, in spaced apart relation to the outer screen;

(f) a third screen located in spaced apart relation to the inner screen and being mounted within and extending from the outer frame, the inner screen, outer screen, and third screen extending substantially parallel to each other in separate, parallel, vertical planes:

(g) means to mount the outer, inner, and third screens to the frame;

(h) means to provide electrical current from the transformer to both the outer and inner screens;

(i) adjustable closure means positioned in spaced relation to the outer screen to control the admission of light, heat, and carbon dioxide through the screens to assist in attracting insects; and (j) extension means moveably adjustable outward from the outer frame to rigidly secure the unit within the opening of the window, whereby the unit, being unitary and self-contained, is insertable and configured to be fitted, as a unit, into a variety of window openings.

2. The insect termination unit as in claim 1 wherein the means to mount the outer and inner screens comprises connectors made of non-electrical conducting material.

3. The insect termination unit as in claim 1 wherein the means to provide electrical current to the screens comprises insulated wire leads.

4. The insect termination unit as in claim 1 wherein the extension means comprises wing elements slideably adjustable laterally into and out of the frame.

* * * * *